US010966571B1

(12) United States Patent
Barrett et al.

(10) Patent No.: US 10,966,571 B1
(45) Date of Patent: Apr. 6, 2021

(54) HAND HELD HERB OR TOBACCO GRINDER

(71) Applicant: Warehouse Goods LLC, Boca Raton, FL (US)

(72) Inventors: Jason Barrett, Boca Raton, FL (US); Gabriel Alvarez-Jacobo, Boca Raton, FL (US); Aaron LoCascio, Boca Raton, FL (US)

(73) Assignee: WAREHOUSE GOODS, LLC., Boca Raton, FL (US)

(*) Notice: Subject to any disclaimer, the term of this patent is extended or adjusted under 35 U.S.C. 154(b) by 60 days.

(21) Appl. No.: 15/789,963

(22) Filed: Oct. 21, 2017

Related U.S. Application Data

(60) Provisional application No. 62/437,053, filed on Dec. 20, 2016.

(51) Int. Cl.
*A47J 42/34* (2006.01)
*A47J 42/36* (2006.01)

(52) U.S. Cl.
CPC ............. *A47J 42/34* (2013.01); *A47J 42/36* (2013.01)

(58) Field of Classification Search
CPC .................................. A47J 42/34; A47J 42/36
USPC ..................... 241/168, 169.1, 278.1
See application file for complete search history.

(56) References Cited

U.S. PATENT DOCUMENTS

| | | | | |
|---|---|---|---|---|
| 2,749,681 | A * | 6/1956 | Reidenbach | B24D 7/12 451/527 |
| 3,353,308 | A * | 11/1967 | Zane | B24D 11/005 451/529 |
| 4,348,950 | A * | 9/1982 | Harris | A47J 19/06 100/116 |
| 4,366,930 | A * | 1/1983 | Trombetti, Jr. | A61J 7/0007 241/169 |
| 5,071,663 | A * | 12/1991 | Dugan | A47J 43/255 241/168 |
| D362,791 | S * | 10/1995 | Ming | D7/665 |
| 7,147,174 | B2 * | 12/2006 | Mansen | A47J 42/34 241/30 |
| 7,204,440 | B2 * | 4/2007 | Fouse | A47J 42/34 241/168 |
| 7,367,519 | B2 * | 5/2008 | de Groote | A47J 19/04 241/169.1 |
| 7,422,170 | B2 * | 9/2008 | Bao | B02C 18/24 241/168 |
| D658,005 | S * | 4/2012 | Haggerty | D7/412 |
| D668,912 | S * | 10/2012 | Haggerty | D7/412 |
| 9,510,709 | B2 * | 12/2016 | Wilson | A47J 42/14 |
| 9,730,554 | B2 * | 8/2017 | Chan | A47J 42/34 |
| 9,873,125 | B1 * | 1/2018 | LaGuardia, Jr. | A24F 13/24 |
| 10,039,418 | B2 * | 8/2018 | Staiano | B02C 23/10 |
| 2006/0076442 | A1 * | 4/2006 | Fouse | A47J 42/34 241/169.1 |
| 2008/0191073 | A1 * | 8/2008 | Bao | B02C 18/24 241/101.2 |
| 2008/0271614 | A1 * | 11/2008 | Chan | A47J 19/005 99/537 |

(Continued)

Primary Examiner — Faye Francis

(57) ABSTRACT

An herb or tobacco grinder is provided in which the cutting surfaces line a series of elongated, curved grooves. The slots or grooves are laterally elongated such as to easily receive leaf material, as well as stem, seed or the like. The slots or grooves are slightly curved in opposite directions and intersect to form an impingement cutting region.

9 Claims, 5 Drawing Sheets

ISOMETRIC VIEW

SCALE 1:1

ISOMETRIC VIEW

SCALE 1:1

(56) References Cited

U.S. PATENT DOCUMENTS

| | | | |
|---|---|---|---|
| 2014/0261471 A1* | 9/2014 | Ruzycky | A47J 42/14 131/108 |
| 2016/0029691 A1* | 2/2016 | Ruzycky | A47J 42/12 241/24.1 |
| 2016/0128513 A1* | 5/2016 | Chan | A47J 42/34 241/28 |
| 2018/0168398 A1* | 6/2018 | Wang | A47J 42/34 |
| 2018/0271328 A1* | 9/2018 | Petrossian | A47J 42/34 |
| 2019/0150666 A1* | 5/2019 | Wozniak | A24B 7/00 |
| 2019/0269277 A1* | 9/2019 | Larose | A47J 42/34 |

* cited by examiner

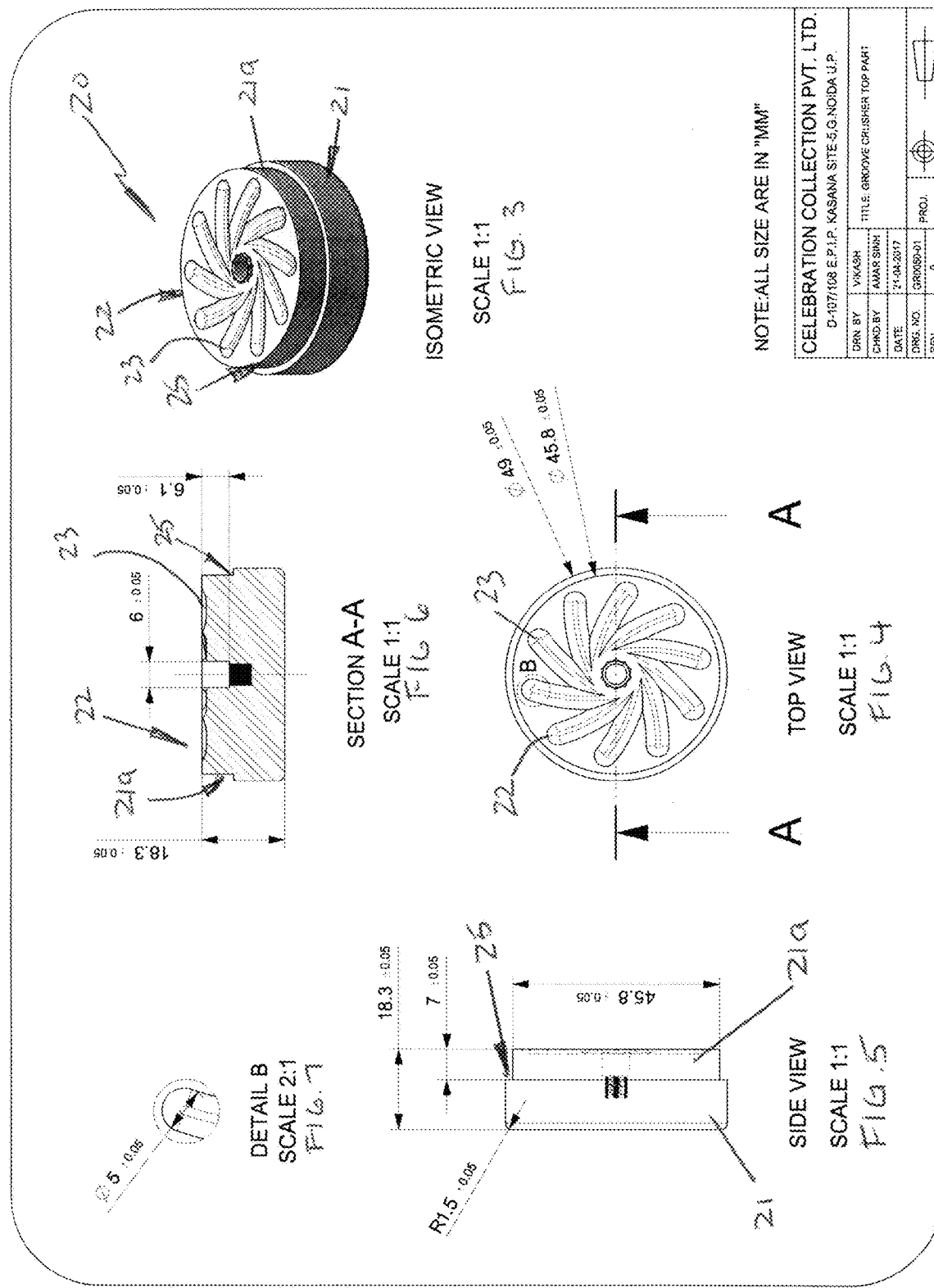

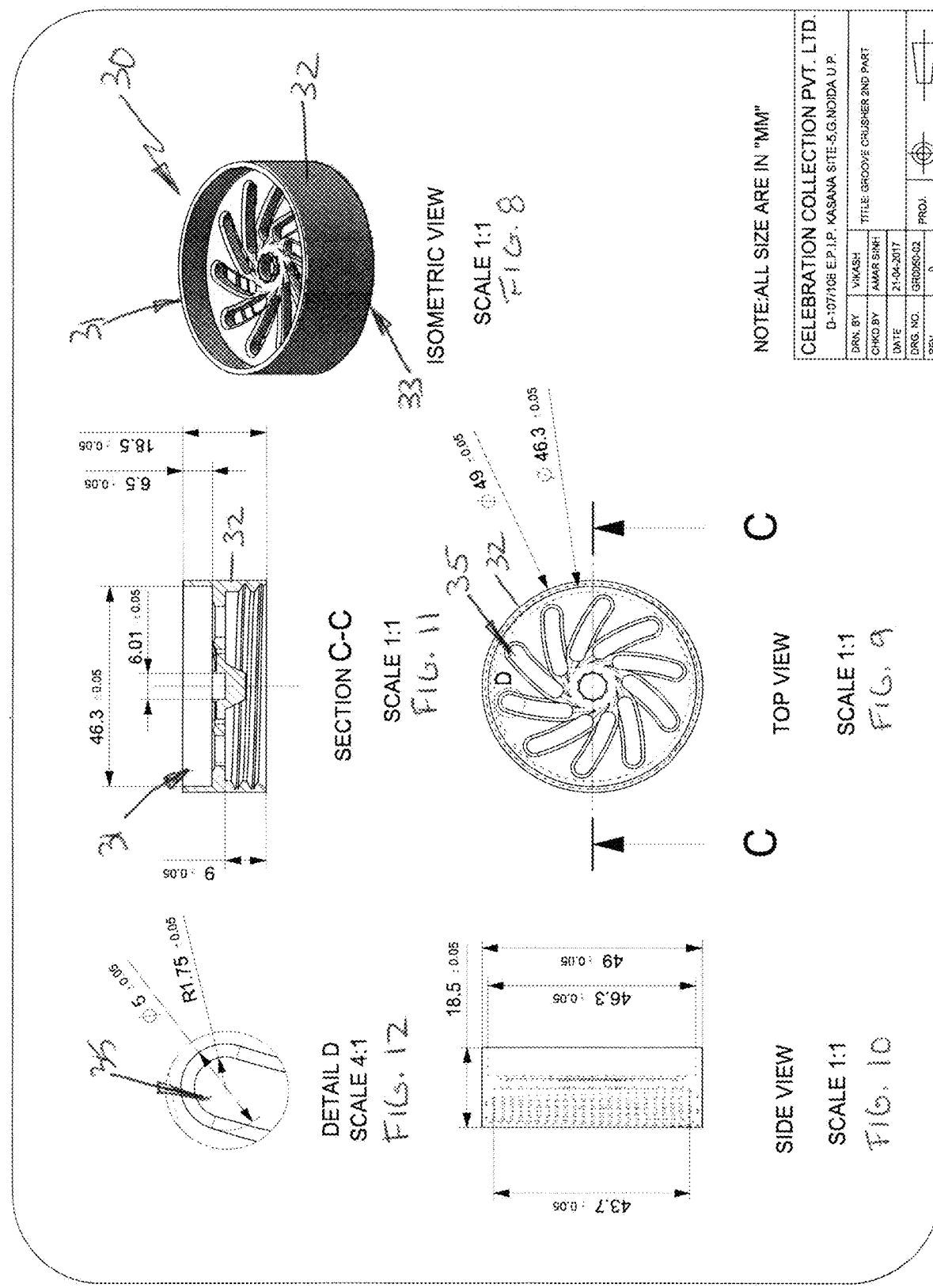

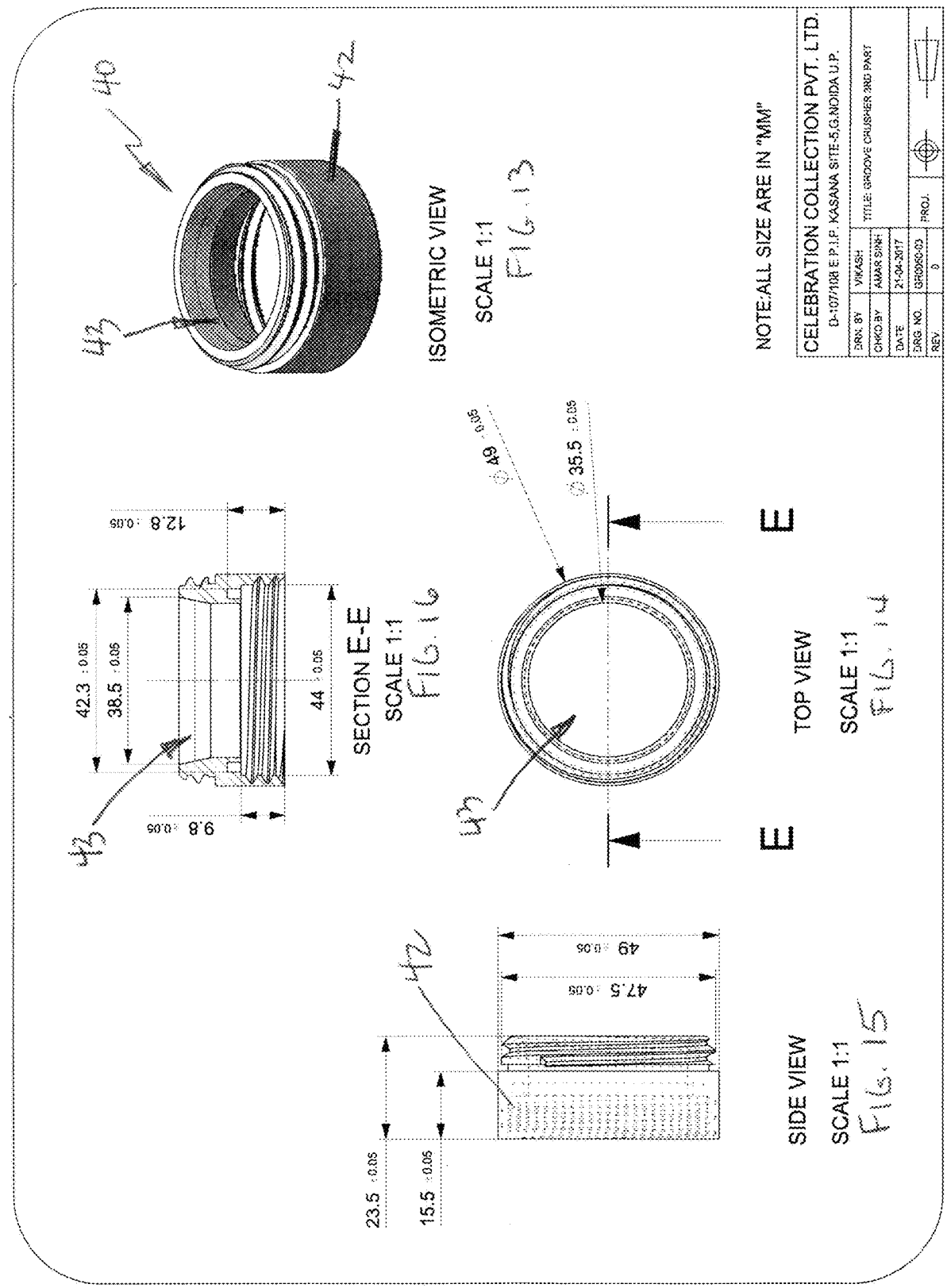

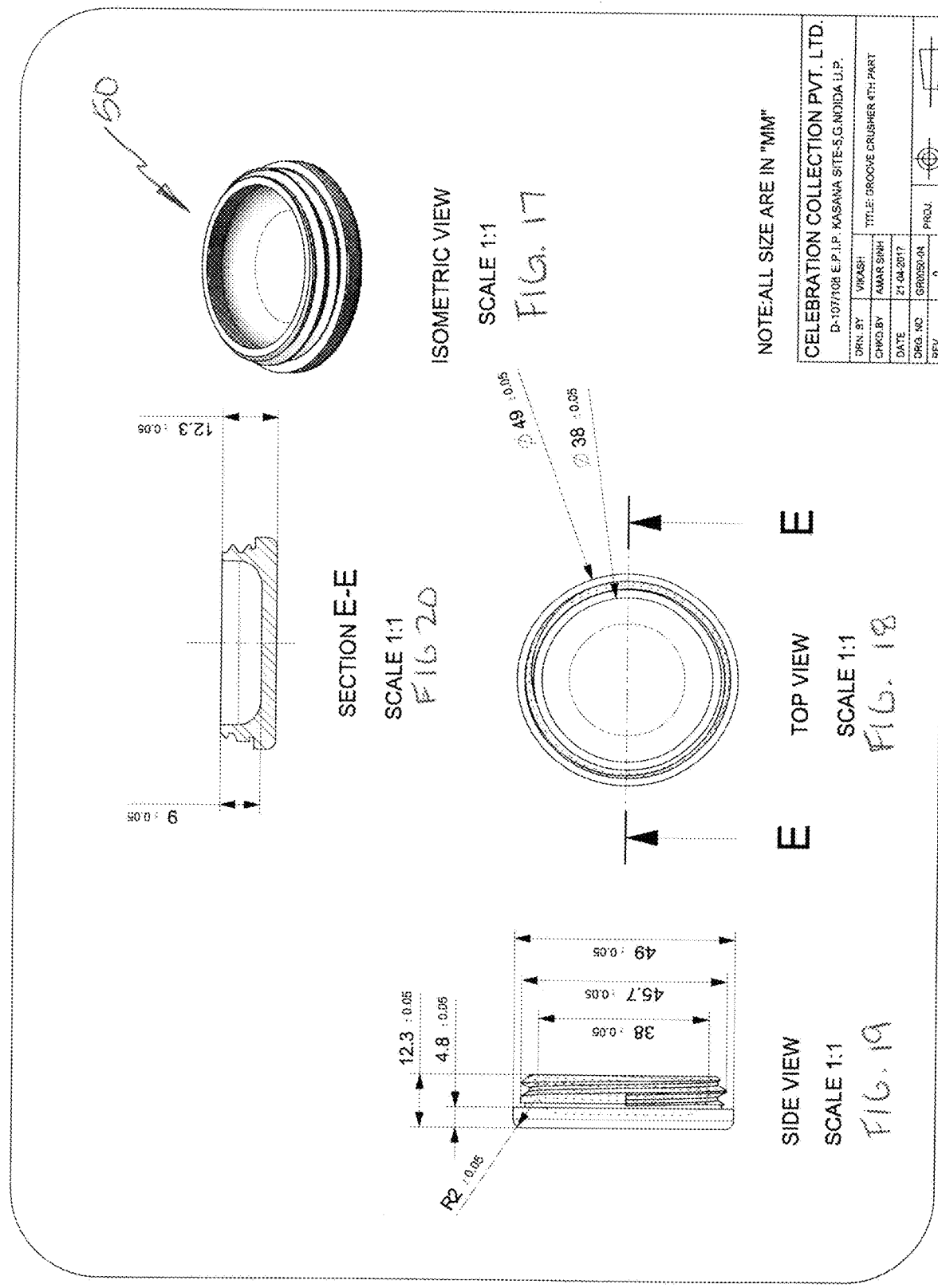

HAND HELD HERB OR TOBACCO GRINDER

RELATED APPLICATIONS

The present application claims benefit of U.S. Provisional Application 62/345,803, filed on Jun. 27, 2016.

BACKGROUND OF THE INVENTION

1. Field of the Invention

The present invention is related to an apparatus for grinding of herbaceous materials and, more particularly, to an improved handheld tobacco grinder having elongated impingement slot for use in cutting and grinding such materials.

2. Description of the Related Art

The grinding of leafy herbs, including tobacco, is often performed in hand held devices that cut, shred or grind dried herbaceous materials. While ideally the material is sifted and selected such as to be of uniform grindability, such is not always the case. Being agricultural products, plants such as tobacco, cloves, and other herbs or spices may result in nonuniformity of consistency.

Today, the most widely used tobacco grinder design is one with three cavities, a top cap, and a bottom cap. The top half of the first cavity is formed by the top cap. A plurality of grinding knives protrudes from the top cap. The bottom half of the first cavity also has a plurality of grinding knives and several large holes that lead into the second cavity. The second cavity has a screen that leads into the third cavity. The bottom half of the third cavity is formed by the bottom cap of the grinder. A dried tobacco leaf is placed inside the first cavity. The top cap is then rotated relative to the rest of the grinder allowing the grinding knives to cut the tobacco into smaller pieces. The smaller tobacco pieces are then passed through the large holes into the second cavity and then through the screen into the third cavity. The pieces in the second cavity can then be directed back to the first cavity for further grinding. The ground tobacco in the third cavity is collected in the bottom cap which is removed by the user when ready to smoke it.

A major disadvantage of today's popular tobacco grinder is the inadequate ability to easily grind nonuniform materials that may include saps, seeds, stems, veins or variations in leaf cuticle or dermis.

Consequently, the need exists for improvements in hand held tobacco or herb grinders that are capable of easily receiving nonuniform herbaceous materials.

SUMMARY OF THE INVENTION

Accordingly, the present invention has been made in view of the above-mentioned disadvantages occurring in the prior art.

The present invention is a tobacco grinder in which the cutting surfaces line a series of elongated, curved grooves. The slots or grooves are laterally elongated such as to easily receive leaf material, as well as stem, seed or the like. The slots or grooves are slightly curved in opposite directions and intersect to form an impingement cutting region. Such improvements may be implemented in a hand held tobacco grinder that operates in a manually manipulated manner familiar to other conventionally available grinders.

It is therefore a primary object of the present invention to provide elongated, grooved cutting slots in the tobacco grinder in which the nonhomogeneous herbaceous material may be reduced.

Further features of the invention will become apparent in the course of the following description and in light of the structure and operation of various embodiments of the present invention, are described in detail below with reference to the accompanying description and drawings.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 3 is a bottom isometric view of the top cap 20 for use therewith;

FIG. 4 is a bottom plan view thereof;

FIG. 5 is a side elevational view thereof;

FIG. 6 is a cross sectional view taken along line A-A of FIG. 4;

FIG. 7 is a detail top plan of a groove 23 taken along Detail B of FIG. 4;

FIG. 8 is a top isometric view of a grinding chamber 30 for use therewith;

FIG. 9 is a top plan view thereof;

FIG. 10 is a side view thereof;

FIG. 11 is a cross sectional view taken along line C-C of FIG. 9;

FIG. 12 is a top plan view of a cutting slot 35 taken along Detail D of FIG. 9;

FIG. 13 is an isometric view of a collection chamber 40 for use therewith;

FIG. 14 is a top plan view thereof;

FIG. 15 is a side elevational view thereof;

FIG. 16 is a cross sectional view taken along line E-E of FIG. 14;

FIG. 17 is an isometric view of a lower cover 50 for use therewith;

FIG. 18 is a top plan view thereof;

FIG. 19 is a side elevational view thereof; and

FIG. 20 is a cross sectional view taken along line E-E of FIG. 18.

DESCRIPTION OF THE PREFERRED EMBODIMENTS

The best mode for carrying out the invention is presented in terms of its preferred embodiment, herein depicted within the Figures.

1. Detailed Description of the Figures

Figure 1:
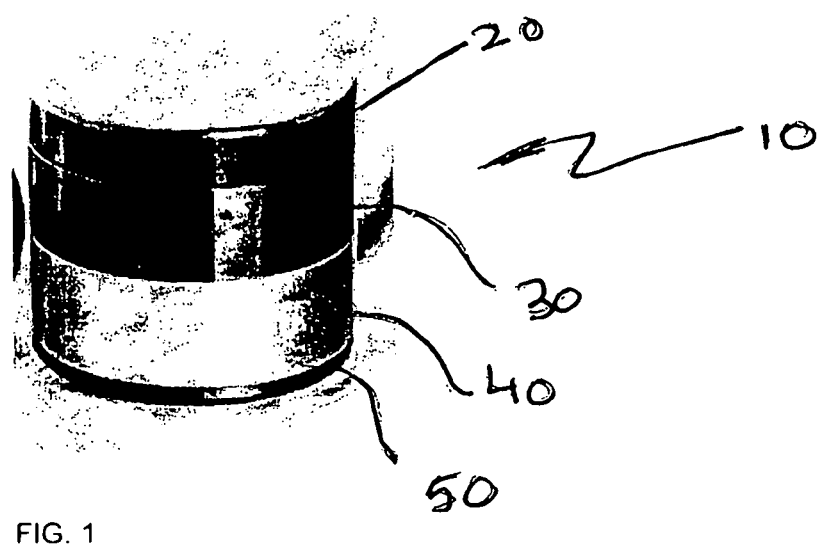
FIG. 1 is a top front perspective view photograph of a tobacco grinder embodying the preferred embodiment of the present invention.
Figure 2:
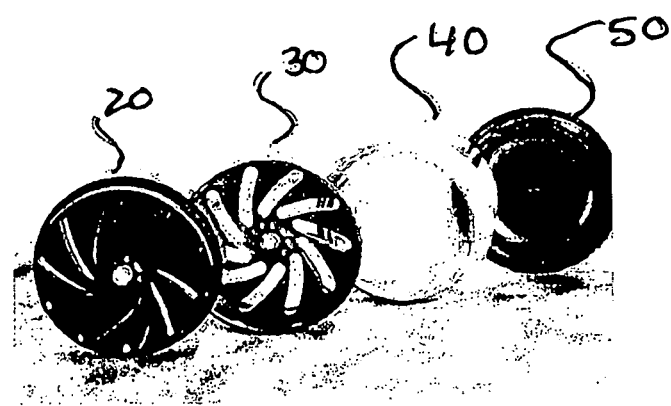
FIG. 2 is a top plan view photograph of the tobacco grinder of FIG. 1 shown disassembled.

As shown in FIGS. 1 and 32, the present invention comprises a tobacco grinder, generally noted as 10, with a top cap 20, a grinding chamber 30, a collection chamber 40 and a lower cap 50.

As shown in conjunction with FIG. 3 through 7, the top cap 20 is shown in greater detail being circular in shape with a sidewall 21 that defines its bottom opening that is offset 21a for receiving into the grinding chamber 30. The bottom face 22 has multiple grooves 23 formed therein which form elongated grinding edges 24. Each groove 23 has a width of approximately 5 mm, and forms a coaxial turbine or pinwheel shape. The top cap 30 further provides a magnetic closure as will be described in greater detail below.

As shown in conjunction with FIG. 8 through 12, the grind chamber 30 is shown in greater detail as an annular object with a top opening 31 defined by a top sidewall 32 and a bottom opening 33 defined by a bottom sidewall 34. The bottom sidewall 24 has an outer diameter that is equal to the outer diameter of the sidewall 21 of the top cap 20. Whereas, the top sidewall 21a has an outer diameter that is a fraction of an inch less than the inner diameter of the sidewall 21 of the top cap 20. This dimensional configuration allows the top cap 20 to be placed directly over the top sidewall 32 of the grinding chamber 30 and rest on an outer edge 25 created by the bottom sidewall 21. The grinding chamber 30 further form a series of slots 35. The slots 35 are similarly sized and shaped as the grooves 24 of the top 20, but are arcuately spanning in a mirror image such that the grooves 24 and slots 35 crisscross at an acute angle.

As shown in conjunction with FIG. 13 through 16, a collection chamber 40 is shown in greater detail formed to received the grinding chamber 30 and provides for a sidewall 42 that forms a collection volume 43 for receipt of ground materials.

As shown in conjunction with FIG. 17 through 20, a bottom cover 50 is shown that is threadingly engaged with the lower end of the collection chamber 40.

2. Operation of the Preferred Embodiment

In order to use the product of the present invention, dried tobacco leaves or similar materials are placed between the grinding chamber 30 on top or within the bottom grinding knives. With the tobacco leaves in the grinding chamber 30, the top cap 20 is replaced over the grinding chamber 30 and held in place with magnets providing an urging force for connection to the collection chamber 40. The collection chamber 40 is affixed to the bottom of the grinding chamber, and the bottom cap 50 secured to seal the collection chamber.

The top cap 20 is thereafter rotated back and forth around the grinding chamber 30 to provide a grinding action by the top and bottom grinding knives for grinding the tobacco leaves within the grinding chamber 30. After the leaves have been grinded in the grinding chamber they are collected in the collection chamber 40. The tobacco pieces that have been finely grinded into the desired size will fall through a screen into the collection chamber 40. Thereafter, the user can remove the lower cap 50 to access the comminuted material.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar case-law or subsequent precedent should not be made if any future claims are added or amended subsequent to this Patent Application.

What is claimed is:

1. A handheld grinder comprising a top cap comprising a bottom face defining multiple arcuate elongate grooves therein;
   a grinding face defining multiple arcuate elongate slots, wherein the grinding face at least partially defines a grinding chamber, the grooves and the slots are positioned on opposing sides of the defined grinding chamber and are arced about a common axis in opposite directions relative to each other;
   a collection chamber at least partially defined by the grinding face and configured to be attached to and in fluid communication with said grinding chamber; and
   a lower cap at least partially defining the collection chamber.

2. The handheld grinder of claim 1, wherein said defined arcuate elongate grooves has a turbine or pinwheel pattern.

3. The handheld grinder of claim 2, wherein said defined arcuate elongate slots has a turbine or pinwheel pattern.

4. The handheld grinder of claim 3, wherein said slots are approximately 5 mm wide or less.

5. The handheld grinder of claim 2, wherein said grooves are approximately 5 mm or less wide.

6. A method of grinding herbaceous material comprising:
   a. utilizing a grinding device;
   b. containing herbaceous material held in a grinding chamber having an upper surface forming a series grooves and a lower surface forming a series of slots, wherein said slots are similarly sized and shaped as the grooves but are arcuately spanning in a mirror image such that the grooves and slots crisscross at an acute angle;
   c. rotating either said upper surface, relative to the lower surface or said lower surface relative to the upper surface; and
   d. collecting ground material in a collection chamber in fluid communication with said slots.

7. The method of claim 6, wherein said upper surface and said lower surface are magnetically urged together.

8. A grinder comprising:
   a first cap including a first cap surface and defining multiple arcuate elongate grooves;
   a second cap on an opposing end of the grinder from the first cap, the second cap including a grinding surface defining multiple arcuate elongate slots;
   wherein the cap surface and the grinding surface at least partially define a grinding chamber; and
   wherein the grooves and the slots are positioned on opposing sides of the defined grinding chamber and are arced about a common axis of the grinder in opposite directions relative to each other.

9. The grinder of claim 8, further comprising:
   a magnet in at least one of the first cap and the second cap, wherein the first cap and the second cap are configured to be magnetically coupled to each other.

* * * * *